United States Patent
Kometani

(10) Patent No.: US 9,091,331 B2
(45) Date of Patent: Jul. 28, 2015

(54) RACK SHAFT SUPPORTING DEVICE AND STEERING SYSTEM USING THE SAME

(71) Applicant: JTEKT CORPORATION, Osaka-shi, Osaka (JP)

(72) Inventor: Hideo Kometani, Nara (JP)

(73) Assignee: JTEKT CORPORATION, Osaka (JP)

( * ) Notice: Subject to any disclaimer, the term of this patent is extended or adjusted under 35 U.S.C. 154(b) by 107 days.

(21) Appl. No.: 13/932,466

(22) Filed: Jul. 1, 2013

(65) Prior Publication Data

US 2014/0007716 A1    Jan. 9, 2014

(30) Foreign Application Priority Data

Jul. 9, 2012    (JP) .................................. 2012-153932

(51) Int. Cl.
| | | |
|---|---|---|
| *B62D 3/12* | (2006.01) | |
| *F16H 19/04* | (2006.01) | |
| *F16H 55/28* | (2006.01) | |

(52) U.S. Cl.
CPC ................ *F16H 19/04* (2013.01); *B62D 3/123* (2013.01); *F16H 55/283* (2013.01); *F16H 55/285* (2013.01); *Y10T 74/18096* (2015.01); *Y10T 74/1967* (2015.01); *Y10T 74/19623* (2015.01)

(58) Field of Classification Search
CPC ....... B62D 3/123; F16H 19/04; F16H 55/283; F16H 55/285
USPC ................ 74/388 PS, 409, 411, 422
See application file for complete search history.

(56) References Cited

U.S. PATENT DOCUMENTS

| | | | | |
|---|---|---|---|---|
| 3,713,349 | A * | 1/1973 | Benson ........................... | 74/409 |
| 3,720,116 | A * | 3/1973 | Better et al. ................. | 74/89.42 |
| 3,722,312 | A * | 3/1973 | Better et al. ................. | 74/89.42 |
| 3,868,888 | A * | 3/1975 | Rehfeld ...................... | 91/375 A |
| 4,428,398 | A * | 1/1984 | Mito et al. .................... | 137/530 |
| 4,724,717 | A * | 2/1988 | Chikuma ....................... | 74/498 |
| 4,987,963 | A * | 1/1991 | Oslapas et al. ................ | 180/445 |
| 6,067,713 | A * | 5/2000 | Bugosh ....................... | 29/893.1 |
| 6,808,042 | B2 * | 10/2004 | Namgung ..................... | 180/444 |
| 7,487,984 | B1 | 2/2009 | Lemont, Jr. et al. | |
| 8,141,448 | B2 * | 3/2012 | Watanabe et al. .......... | 74/424.81 |
| 8,327,731 | B2 * | 12/2012 | Sung et al. ....................... | 74/422 |
| 8,375,818 | B2 * | 2/2013 | Witting et al. ............ | 74/388 PS |

(Continued)

FOREIGN PATENT DOCUMENTS

JP    A-2008-296899    12/2008

OTHER PUBLICATIONS

Extended Search Report issued in European Patent Application No. 13175053.1 dated Jun. 2, 2014.

*Primary Examiner* — Justin Krause
*Assistant Examiner* — Gregory Prather
(74) *Attorney, Agent, or Firm* — Oliff PLC

(57) ABSTRACT

A rack shaft supporting device includes a support yoke, a plug that closes the other opening of an accommodation chamber, a ball screw mechanism between the support yoke and the plug, and a torsion urging member between the ball screw mechanism and the plug. The ball screw mechanism includes: a first threaded portion in which a first thread groove is formed; a second threaded portion in which a second thread groove is formed; and balls arranged in a rolling path formed of the first thread groove and the second thread groove. The torsion urging member rotates the second threaded portion relative to the plug and moves the second threaded portion toward the support yoke.

4 Claims, 4 Drawing Sheets

(56) References Cited

U.S. PATENT DOCUMENTS

| | | | |
|---|---|---|---|
| 8,511,896 B2* | 8/2013 | Shirai et al. | 384/15 |
| 2002/0124670 A1* | 9/2002 | Bugosh | 74/388 PS |
| 2002/0164095 A1* | 11/2002 | Nagai et al. | 384/49 |
| 2003/0190098 A1* | 10/2003 | Chou et al. | 384/49 |
| 2004/0020741 A1* | 2/2004 | Kapaan et al. | 192/84.6 |
| 2006/0023980 A1* | 2/2006 | Kato et al. | 384/43 |
| 2007/0163375 A1* | 7/2007 | Counts | 74/422 |
| 2008/0295629 A1 | 12/2008 | Song | |
| 2010/0095793 A1* | 4/2010 | Tachikake et al. | 74/424.81 |
| 2010/0122595 A1 | 5/2010 | Sung et al. | |
| 2010/0158420 A1* | 6/2010 | Michioka et al. | 384/45 |
| 2010/0320042 A1* | 12/2010 | Giering et al. | 188/162 |
| 2012/0128277 A1* | 5/2012 | Ju et al. | 384/10 |
| 2012/0192662 A1* | 8/2012 | Kluge | 74/89.17 |
| 2013/0000434 A1* | 1/2013 | Cavalier et al. | 74/411.5 |
| 2013/0319141 A1* | 12/2013 | Yamamoto et al. | 74/30 |
| 2014/0007716 A1* | 1/2014 | Kometani | 74/30 |
| 2014/0020493 A1* | 1/2014 | Nakamura | 74/422 |
| 2014/0026694 A1* | 1/2014 | Wodtke | 74/30 |

* cited by examiner

RACK SHAFT SUPPORTING DEVICE AND STEERING SYSTEM USING THE SAME

INCORPORATION BY REFERENCE/RELATED APPLICATION

This application claims priority to Japanese Patent Application No. 2012-153932 filed on Jul. 9, 2012 the disclosure of which, including the specification, drawings and abstract, is incorporated herein by reference in its entirety.

BACKGROUND OF THE INVENTION

1. Field of the Invention

The invention relates to a rack shaft supporting device and a steering system using the rack shaft supporting device.

2. Description of Related Art

As a rack shaft supporting device, a support yoke clearance automatic adjusting device is described in US 2008/0295629 A1. The support yoke clearance automatic adjusting device includes a support yoke by which a rack shaft is slidably supported, a cam that supports the support yoke, a support plug that supports the cam and that is connected to a rack housing, and a yoke spring that applies an elastic force to the support yoke in a direction toward the rack shaft. Because the rack shaft is pushed against a pinion by the elastic force, it is possible to suppress generation of abnormal noise or the like at meshed portions of the rack shaft and the pinion.

On an opposed face of the cam, which is opposed to the support yoke, three chevron separation portions that project toward the support yoke are formed in respective three regions each of which corresponds to 120° and which are located next to each other in the circumferential direction. Each of the separation portions has a slant face gradually slanted toward the support yoke, and an end face that extends, in a direction away from the support yoke, from a support yoke-side edge of the slant face.

Three portions corresponding to the separation portions of the cam are formed at a portion of the support yoke, which is opposed to the cam, so that the separation portions of the cam are engaged with the separation portions of the support yoke (the portions corresponding to the separation portions of the cam). On the end face of each of the separation portions of the cam, there is provided an elastic member that projects toward the adjacent separation portion of the support yoke (the portion corresponding to the separation portion of the cam). When the support yoke is abraded by friction or the like with the rack shaft, or when rack teeth of the rack shaft are abraded by the mesh between the rack shaft and the pinion, the cam rotates relative to the support yoke due to an elastic force of the elastic member, and each of the separation portions of the cam pushes the support yoke toward the rack shaft. Thus, the support yoke is pushed toward the rack shaft irreversibly by an amount corresponding to the abrasion and the abrasion is compensated for, so that the yoke spring is able to apply a constant elastic force to the support yoke in spite of the abrasion.

In the support yoke clearance automatic adjusting device described in US 2008/0295629 A1, when the cam rotates relative to the support yoke, the separation portions of the cam and the separation portions of the support yoke (the portions corresponding to the separation portions of the cam) make surface contact with each other and slide relative to each other. Thus, significantly high frictional resistance to the rotation of the cam is generated. This causes a possibility that even if the abrasion occurs, the cam is not able to rotate promptly in response to the abrasion and therefore the abrasion is not sufficiently compensated for.

In addition, on the opposed face of the cam, which is opposed to the support yoke, the separation portions of the cam are formed in the respective three regions each of which corresponds to 120° and which are located next to each other in the circumferential direction. Therefore, it is possible to compensate for abrasion by moving the support yoke toward the rack shaft, while the cam is rotated one-third turn. However, it is not possible to compensate for an abrasion larger than the abrasion that is compensated for as described above. Further, in some cases, high-viscosity grease is provided between the cam and the support yoke in order to prevent, when the rack shaft is distorted by an external force or the like and moved away from the support yoke suddenly, the support yoke from suddenly moving toward the rack shaft so as to follow the bending of the rack shaft. As a result, the support yoke is prevented from locking the movement of the rack shaft. Because the support yoke is connected to the cam via the grease, it is possible to prevent occurrence of a problem that only the support yoke suddenly moves toward the rack shaft. However, characteristics of the grease tend to vary with temperature, which makes it difficult to reliably prevent the support yoke from suddenly moving toward the rack shaft. Further, if high-viscosity grease is provided between the cam and the support yoke, one of the cam and the support yoke comes off the other, and therefore the relative position between the cam and the support yoke may be offset from the proper relative position. In view of this, preferably, grease should not be provided between the cam and the support yoke.

SUMMARY OF THE INVENTION

The invention provides a rack shaft supporting device configured to improve the reliability of an operational function of compensating for abrasion in a configuration in which a rack shaft is urged toward a pinion, and provides a steering system using the rack shaft supporting device.

According to a feature of an example of the invention, there is provided a rack shaft supporting device arranged in an accommodation chamber formed on a back side of a rack shaft, the back side being an opposite side of the rack shaft from a side on which the rack shaft meshes with a pinion, the accommodation chamber having one opening opposed to the rack shaft, an inner peripheral wall recessed from the one opening in a direction away from the rack shaft, and the other opening opened at a bottom side of the inner peripheral wall, the rack shaft supporting device being configured to push the rack shaft toward the pinion, the rack shaft supporting device, including: a support yoke that faces the rack shaft from the one opening, and that supports the rack shaft such that the rack shaft is slidable in an axial direction of the rack shaft; a plug that closes the other opening; a ball screw mechanism provided between the support yoke and the plug in the accommodation chamber, the ball screw mechanism including a first threaded portion fixed to an inner peripheral wall and having an inner peripheral face in which a first thread groove is formed, a second threaded portion arranged radially inward of the inner peripheral face of the first threaded portion and having an outer peripheral face in which a second thread groove is formed, and a plurality of balls arranged in a rolling path formed of the first thread groove and the second thread groove that are opposed to each other; and a torsion urging member arranged between the ball screw mechanism and the plug, the torsion urging member being urged so as to rotate the second threaded portion relative to the plug and to move the second threaded portion toward the support yoke.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
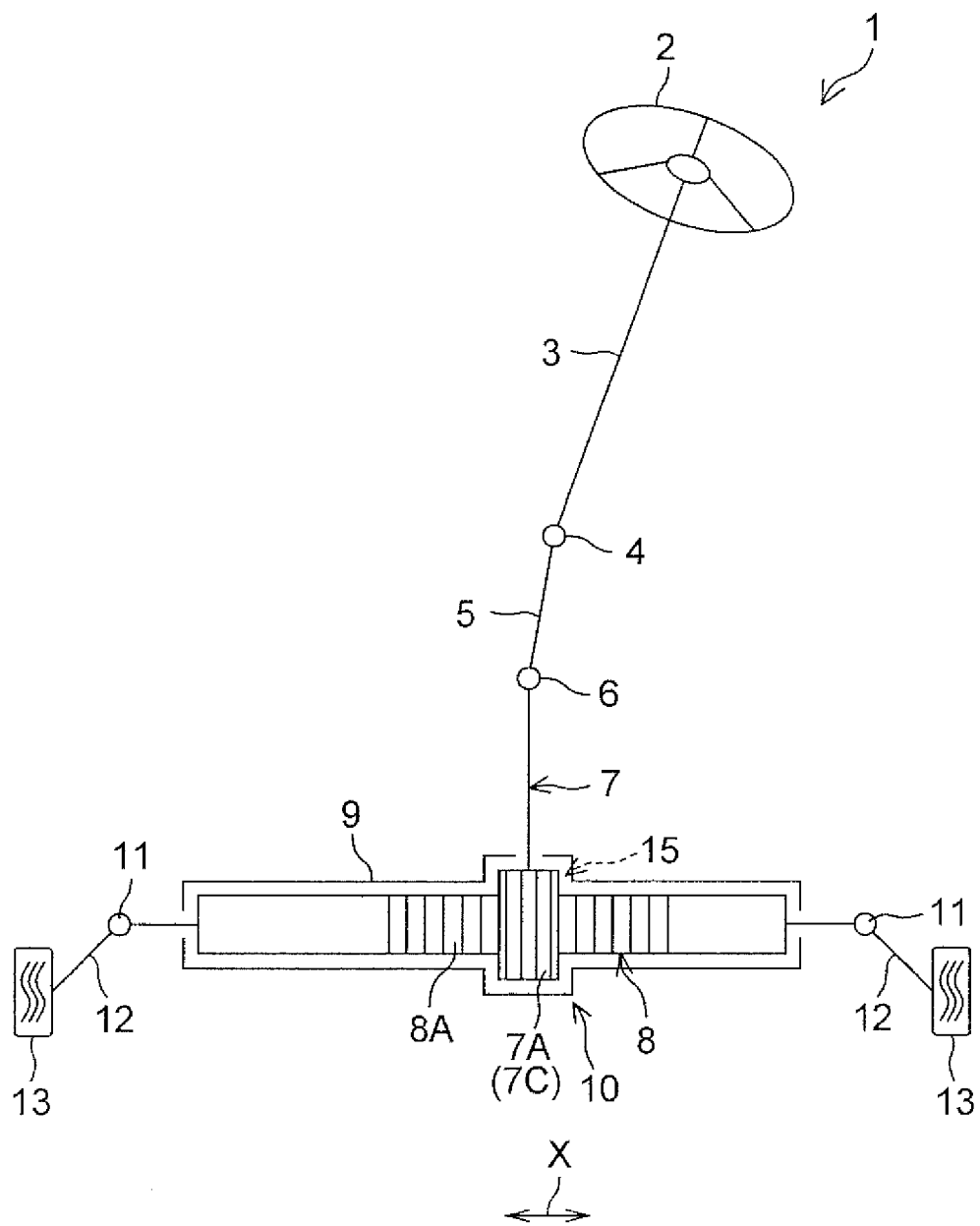
FIG. 1 is a schematic view illustrating the schematic configuration of a rack-and-pinion steering system according to an embodiment of the invention.

FIG. 1 is a schematic view illustrating the schematic configuration of a rack-and-pinion steering system 1 according to an embodiment of the invention. As shown in FIG. 1, the steering system 1 mainly includes a steering member 2 such as a steering wheel, a steering shaft 3, a first universal joint 4, an intermediate shaft 5, a second universal joint 6, a pinion shaft 7, a rack shaft 8, and a housing 9. The steering shaft 3 is connected to the steering member 2. The steering shaft 3 and the intermediate shaft 5 are connected to each other via the first universal joint 4. The intermediate shaft 5 and the pinion shaft 7 are connected to each other via the second universal joint 6.

Near an end portion of the pinion shaft 7, a cylindrical or columnar pinion 7A is provided. The rack shaft 8 has a columnar shape, and extends in the vehicle-width direction (the lateral direction in FIG. 1, referred to as "axial direction X," where appropriate). A rack 8A is formed in a portion in the circumferential direction, of the outer peripheral face of the rack shaft 8, the portion being in an intermediate region of the rack shaft 8 in the axial direction X. The pinion shaft 7 is arranged so as to extend in a direction (the up-down direction in FIG. 1) that crosses the rack shaft 8 that extends in the axial direction X, and the pinion 7A of the pinion shaft 7 engages with the rack 8A of the rack shaft 8. The pinion shaft 7 and the rack shaft 8 configured as described constitute a rack-and-pinion mechanism 10. In view of this, the steering system 1 is a rack-and-pinion steering system.

The housing 9 is made of metal, has a long hollow-cylindrical shape extending along the rack shaft 8 (the axial direction X), and is fixed to a vehicle body (not shown). The rack shaft 8 is accommodated in the housing 9, and, in this state, the rack shaft 8 is allowed to linearly reciprocate along the axial direction X. The pinion shaft 7 (the pinion 7A) is arranged at a position between both end portions of the housing 9 in the axial direction X (at substantially the center position in the axial direction X in FIG. 1).

The end portions (in the axial direction X) of the rack shaft 8 accommodated in the housing 9 project outward from the housing 9, and tie rods 12 are connected to the respective end portions via respective joints 11. The tie rods 12 are connected to wheels 13 via corresponding knuckle arms (not shown). When the steering shaft 3 is rotated in response to an operation of the steering member 2, the rotation is converted into a linear motion of the rack shaft 8 along the axial direction X by the pinion 7A and the rack 8A. As a result, the wheels 13 are steered.

Figure 2:
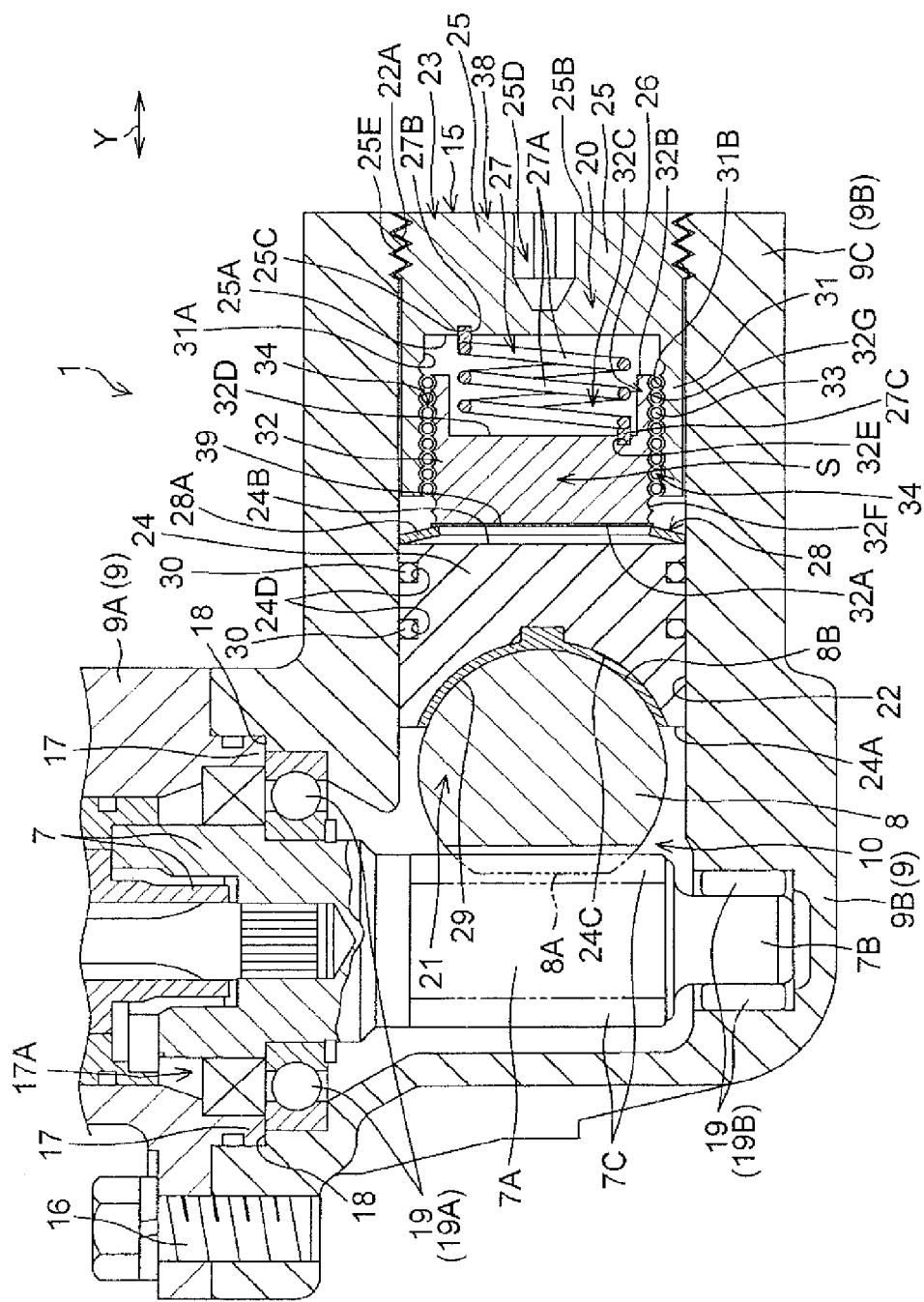
FIG. 2 is a sectional view illustrating a rack shaft supporting device and its surroundings.

FIG. 2 is a sectional view illustrating a rack shaft supporting device 15 and its surroundings in the steering system 1. In FIG. 2, in addition to the aforementioned housing 9 and rack-and-pinion mechanism 10 (the pinion shaft 7 and the rack shaft 8), the rack shaft supporting device 15, which is part of the steering system 1, is illustrated. Each of these components will be described below. Note that, FIG. 2 is a sectional view taken along a plane perpendicular to the axial direction X of the rack shaft 8, and the up-down direction of FIG. 2 coincides with the up-down direction of the steering system 1 in FIG. 1. Each of the components will be described below using the up-down direction and the lateral direction in FIG. 2 as reference directions, unless otherwise specified.

The housing 9 may be split into a hollow first housing 9A, which houses (the intermediate shaft 5 side) part of the pinion shaft 7 other than the pinion 7A, and a hollow second housing 9B, which houses the pinion 7A, the rack shaft 8, and the rack shaft supporting device 15. The first housing 9A and the second housing 9B are fitted together with a bolt 16. A protruding portion 17 that projects toward the second housing 9B is formed in a connecting portion of the first housing 9A, which is connected to the second housing 9B, and a recessed portion 18 that receives the protruding portion 17 (the protruding portion 17 is fitted in the recessed portion 18) is formed in the second housing 9B. The protruding portion 17 is hollow, and the pinion shaft 7 is accommodated in the second housing 9B in a state where the pinion shaft 7 is housed in the first housing 9A and passed through a hollow portion 17A of the protruding portion 17. The recessed portion 18 is part of a hollow portion of the second housing 9B.

In the state of FIG. 2 which is used as a reference state, in the second housing 9B, there are arranged two annular bearings 19 one of which is provided at a position immediately below the recessed portion 18 and the other of which is provided at a position further below the above-mentioned position. Each of the bearings 19 (19A, 19B) is fixed to an inner wall face of the second housing 9B. A hollow portion of the upper bearing 19A and a hollow portion of the lower bearing 19B are located on the same axis that extends in the up-down direction.

Part of the pinion shaft 7, which is at the pinion 7A side, is passed through the hollow portions of the upper bearing 19A and the lower bearing 19B. Part of the pinion shaft 7, which is closer to the intermediate shaft 5 than the pinion 7A (upper part of the pinion shaft 7 in FIG. 2), is rotatably supported by the upper bearing 19A, and a distal end 7B (a lower end portion where pinion teeth 7C are not formed, in FIG. 2) of the pinion 7A is rotatably supported by the lower bearing 19B.

Within the second housing 9B, the rack shaft 8 is arranged so as to be opposed, from the outside in the radial direction (from the right side in FIG. 2), to a portion in the circumferential direction, of the outer peripheral face of the pinion 7A (a portion in which the pinion teeth 7C are formed). The cross-section of the rack shaft 8, which is taken along a plane perpendicular to the axial direction X (the direction perpendicular to the sheet on which FIG. 2 is drawn), has a circular shape having a flat part at its portion opposed to the pinion 7A. The portion of the rack shaft 8, which is opposed to the pinion 7A, has the rack 8A that extends along the axial direction X. The rack 8A engages with the pinion 7A (the pinion teeth 7C). A portion of the outer peripheral face of the rack shaft 8, in which the rack 8A is not formed, is a back portion 8B. The cross-section of the back portion 8B has a substantially C shaped arc-shape.

The second housing 9B is integrally provided with a hollow projecting portion 9C that projects toward the right side in a direction away from the pinion 7A and the rack shaft 8. The projecting portion 9C is located at such a position that the rack shaft 8 is interposed between the projecting portion 9C and the pinion 7A (a position which is on the opposite side of the rack shaft 8 from the pinion 7A and which is on the right side of the rack shaft 8 in FIG. 2). A hollow portion of the projecting portion 9C is an accommodation chamber 20 in which the rack shaft supporting device 15 is accommodated. The accommodation chamber 20 is part of the hollow portion of the second housing 9B, and communicates, from the right side, with a region of the hollow portion, where the rack shaft 8 is accommodated. The accommodation chamber 20 is a circular through-hole that extends through the projecting portion 9C in its projection direction (the lateral direction in FIG. 2, the direction indicated by a reference character Y). On the basis of the positional relationship among the rack shaft 8, the pinion 7A, and the projecting portion 9C, it is found that the accommodation chamber 20 is formed on the back side (the back portion 8B side) of the rack shaft 8, that is, on the opposite side of the rack shaft 8 from the side on which the rack shaft 8 meshes with the pinion 7A (the left side of the rack shaft 8, on which the rack 8A is formed in FIG. 2). The accommodation chamber 20 has one opening 21 opposed to the back portion 8B of the rack shaft 8 (including a case where the one opening 21 faces the back portion 8B at a position that overlaps with the back portion 8B), a cylindrical inner peripheral wall 22 that is recessed from the one opening 21 in a direction away from the rack shaft 8, and the other opening 23 that is opened at the bottom side of the inner peripheral wall 22 (at the right side in FIG. 2). The one opening 21 and the other opening 23 are circular holes defined by the inner peripheral wall 22. A threaded portion 22A is formed, along the whole circumference, in an end portion of the inner peripheral wall 22, which is on the other opening 23 side.

The rack shaft supporting device 15 supports the rack shaft 8 such that the rack shaft 8 is slidable in the axial direction X, and pushes the rack shaft 8 toward the pinion 7A. Therefore, in the steering system 1 including the rack shaft supporting device 15, the rack shaft 8 is supported so as to be slidable in the axial direction X, with the use of the rack shaft supporting device 15. The rack shaft supporting device 15 includes a support yoke 24, a plug 25, a ball screw mechanism 26, a torsion urging member 27, and an urging member 28.

The support yoke 24 has a columnar shape having a diameter slightly smaller than that of the inner peripheral wall 22. The support yoke 24 has one end face 24A and the other end face 24B that are respective end faces in its axial direction (the direction indicated by the reference character Y). The other end face 24B (the right end face in FIG. 2) is flat in a direction perpendicular to the axial direction, and a recessed portion 24C recessed in an arc shape toward the other end face 24B is formed in the one end face 24A (the left end face in FIG. 2), which is on the opposite side of the support yoke 24 from the other end face 24B. The recessed portion 24C extends through the support yoke 24 in its radial direction.

A sliding plate 29 having a plate shape curved along the recessed portion 24C is attached to the recessed portion 24C such that the sliding plate 29 is not detachable from the recessed portion 24C. The sliding plate 29 is made of a material (for example, metal) having a low coefficient of friction, or is formed of a curved plate coated with a film made of a material (e.g., fluororesin) having a low coefficient of friction.

On the outer peripheral face of the support yoke 24, multiple (two, in the present embodiment) annular grooves 24D that extend throughout its circumferential direction are formed side by side in the axial direction of the support yoke 24. An O-ring 30 is fitted to each of the annular grooves 24D from the outside in the radial direction of the support yoke 24. In this state, the outer peripheral portion of each O-ring 30 exposed on the outside of the annular groove 24D.

The support yoke 24 is accommodated in the accommodation chamber 20 so as to be coaxial with the inner peripheral wall 22. In this state, the one end face 24A of the support yoke 24 faces the back portion 8B of the rack shaft 8 from the one opening 21. Further, the back portion 8B of the rack shaft 8 is fitted into the recessed portion 24C of the one end face 24A, and an arc face of the recessed portion 24C follows the back portion 8B of the rack shaft 8 with the sliding plate 29 provided between the arc face and the back portion 8B. Thus, the support yoke 24 supports the rack shaft 8 such that the sliding plate 29 allows the rack shaft 8 to slide in the axial direction X (the axial direction of the rack shaft 8). Moreover, the support yoke 24 in this state is movable along its axial direction (the direction indicated by the reference character Y).

Further, the outer peripheral portion of the O-ring 30 in each of the annular grooves 24D of the support yoke 24 makes contact with the inner peripheral wall 22, along the whole circumference, from the radially inner side. Accordingly, a clearance between the inner peripheral wall 22 and the outer peripheral face of the support yoke 24 is closed by the O-rings 30 such that communication between the both sides of the O-rings 30 in the axial direction of the support yoke 24 is blocked. This makes it possible to prevent grease or the like in the second housing 9B from entering the accommodation chamber 20 (the region closer to the other opening 23 than the O-rings 30).

The plug 25 has a columnar shape having a diameter slightly smaller than that of the inner peripheral wall 22. The plug 25 has one end face 25A (a left end face in FIG. 2) and the other end face 25B (a right end face in FIG. 2), which are respective axial end faces of the plug 25. Each of the one end face 25A and the other end face 25B is a flat circular face extending in a direction perpendicular to the axial direction. An engagement hole 25C recessed toward the other end face 25B is formed in the one end face 25A, at a position that is located radially outward of the center of the circular one end face 25A. A tool hole 25D recessed toward the one end face 25A is formed in the other end face 25B, at the center of the circular other end face 25B. A threaded portion 25E is formed, along the entire circumference, in an end portion of the outer peripheral face of the plug 25, which is on the other end face 25B side.

The plug 25 is accommodated in the accommodation chamber 20 from the other opening 23 side such that the one end face 25A is opposed to the other end face 24B of the support yoke 24 (which has been already accommodated in the accommodation chamber 20). At this time, the tool is inserted into the tool hole 25D of the plug 25 from the outside of the accommodation chamber 20 (the right outside of the projecting portion 9C in FIG. 2). By operating the tool, the plug 25 is rotated about its axis to be screwed into the accommodation chamber 20, so that the threaded portion 25E of the plug 25 is fitted to the threaded portion 22A of the inner peripheral wall 22, which is on the other opening 23 side. As illustrated in FIG. 2, when the threaded portion 25E meshes with the threaded portion 22A and therefore the plug 25 is no longer allowed to advance in the accommodation chamber 20, accommodation of the plug 25 into the accommodation chamber 20 (fitting of the plug 25 to the inner peripheral wall 22) is completed. At this time, the plug 25 closes the other opening 23 in a state where the plug 25 is coaxially fixed to the inner peripheral wall 22. Further, in the accommodation chamber 20, a space S is formed between the one end face 25A of the plug 25 and the other end face 24B of the support yoke 24.

The ball screw mechanism 26 is provided in the space S (that is, between the support yoke 24 and the plug 25 in the accommodation chamber 20). The ball screw mechanism 26 includes a first threaded portion 31, a second threaded portion 32, and a plurality of balls 33. The first threaded portion 31 has a circular-tube shape having a diameter slightly smaller than that of the inner peripheral wall 22. The first threaded portion 31 has an inner peripheral face 31A that defines a hollow portion of the first threaded portion 31. A first thread groove 31B is formed in the inner peripheral face 31A. The first thread groove 31B is a spiral groove that extends in a spiral fashion about the central axis of the first threaded portion 31, and the spirals of the spiral groove are gradually offset from each other in the axial direction of the first threaded portion 31. The first threaded portion 31 is arranged coaxially with the inner peripheral wall 22 in the space S, and is opposed to the inner peripheral wall 22 from the radially inside with a small clearance left between the first threaded portion 31 and the inner peripheral wall 22. In FIG. 2, one end portion (a right end portion in FIG. 2) of the first threaded portion 31 is connected to the outer peripheral edge of the one end face 25A of the plug 25 so as to rim the outer peripheral edge. Therefore, the first threaded portion 31 is integrated with the plug 25 fixed to the inner peripheral wall 22 (that is, fixed to the inner peripheral wall 22—side portion), and projects from the one end face 25A of the plug 25 toward the other end face 24B of the support yoke 24.

The second threaded portion 32 has a columnar shape having a diameter smaller than that of the inner peripheral face 31A of the first threaded portion 31. The second threaded portion 32 has one end face 32A (a left end face in FIG. 2) and the other end face 32B (a right end face in FIG. 2), which are respective axial end faces of the second threaded portion 32. Each of the one end face 32A and the other end face 32B is a flat circular face extending in a direction perpendicular to the axial direction. A cylindrical recessed portion 32C recessed toward the one end face 32A is formed at the center of the circular other end face 32B. A bottom face 32D of the recessed portion 32C has a circular shape.

An engagement hole 32E recessed toward the one end face 32A is formed in the bottom face 32D, at a position radially outward of the center of the circular bottom face 32D. A second thread groove 32G is formed, along the whole circumference, in an outer peripheral face 32F of the second threaded portion 32. The second thread groove 32G is a spiral groove that extends in a spiral fashion about the central axis of the second threaded portion 32, and the spirals of the spiral groove are gradually offset from each other in the axial direction of the second threaded portion 32.

The second threaded portion 32 is arranged radially inward of the inner peripheral face 31A of the first threaded portion 31 in the space S. In this state, the second threaded portion 32 is coaxial with the first threaded portion 31 (consequently, coaxial with the inner peripheral wall 22). In this state, the bottom face 32D of the recessed portion 32C is opposed to the one end face 25A of the plug 25 at a distance greater than the depth of the recessed portion 32C. The one end face 32A is opposed to the other end face 24B of the support yoke 24. Furthermore, the first thread groove 31B of the first threaded portion 31 is opposed to the second thread groove 32G of the second threaded portion 32, with a clearance, from the outside in the radial direction of the inner peripheral wall 22 (or the first threaded portion 31 and the second threaded portion 32). Opposed portions of the first thread groove 31B and the second thread groove 32G constitute a spiral rolling path 34 that extends in a spiral fashion about the central axis of the inner peripheral wall 22 (or the first threaded portion 31 and the second threaded portion 32), and the spirals of the spiral rolling path 34 are gradually offset from each other in the axial direction of the inner peripheral wall 22. That is, the rolling path 34 is formed of the first thread groove 31B and the second thread groove 32G that are opposed to each other.

The balls 33 are small spherical bodies made of metal or the like, are arranged in the rolling path 34, and are rollable within the rolling path 34. Because the balls 33 are arranged between the first threaded portion 31 and the second threaded portion 32, the second threaded portion 32 is allowed to rotate relative to the first threaded portion 31 about their central axis and to slide along their axial direction (the direction indicated by the reference character Y). For example, when the second threaded portion 32 is rotated clockwise as viewed from the left side in FIG. 2, the second threaded portion 32 moves toward the plug 25 (the right side in FIG. 2) while being rotated. On the other hand, when the second threaded portion 32 is rotated counterclockwise as viewed from the left side, the second threaded portion 32 moves toward the support yoke 24 (the left side in FIG. 2) while being rotated.

When viewed from the outside in the radial direction of the inner peripheral wall 22, the rolling path 34 (the first thread groove 31B and the second thread groove 32G) is slanted at a predetermined angle (e.g., 5° or less, and preferably approximately 2°) with respect to the radial direction (the direction perpendicular to the axial direction of the inner peripheral wall 22). This allows the second threaded portion 32 to rotate efficiently and to slide. The torsion urging member 27 is a coil spring. More specifically, the torsion urging member 27 has a main portion 27A, one end side engagement portion 27B, and the other end side engagement portion 27C that are integrated with each other. The main portion 27A is formed by winding a metal wire in a spiral fashion. The one end side engagement portion 27B extends from one end (a right end in FIG. 2) of the main portion 27A outward in the axial direction of the main portion 27A (toward the right side in FIG. 2). The other end side engagement portion 27C extends from the other end (a left end in FIG. 2) of the main portion 27A outward in the axial direction of the main portion 27A (toward the left side in FIG. 2). In a state where the torsion urging member 27 is present alone and an external force is not applied to the torsion urging member 27, the one end side engagement portion 27B and the other end side engagement portion 27C may be located at the same position in the circumferential direction of the main portion 27A, or may be located at different positions.

The torsion urging member 27 is provided between the ball screw mechanism 26 and the plug 25 in the space S. More specifically, the torsion urging member 27 is accommodated over the recessed portion 32C of the second threaded portion 32 and part of the hollow portion of the first threaded portion 31, which communicates with the recessed portion 32C from the plug 25 side. In this state, the main portion 27A of the torsion urging member 27 is coaxial with the first threaded portion 31 and the second threaded portion 32 (consequently, coaxial with the inner peripheral wall 22). Further, in this state, the one end side engagement portion 27B of the torsion urging member 27 is fitted in and engaged with the engagement hole 25C in the one end face 25A of the plug 25, and the other end side engagement portion 27C is fitted in and engaged with the engagement hole 32E in the bottom face 32D of the recessed portion 32C of the second threaded portion 32.

The urging member 28 is a so-called belleville spring or a compression spring. In the present embodiment, the urging member 28 is a discoidal or ring-shaped belleville spring. The urging member 28 is provided between the one end face 32A of the second threaded portion 32 and the other end face 24B of the support yoke 24 in a state where the urging member 28 is compressed from both sides in the axial direction of the inner peripheral wall 22 by the one end face 32A and the other end face 24B. In the urging member 28, an outer peripheral portion 28A is slanted toward the other end face 24B of the support yoke 24, and is elastically deformed by being compressed as described above. The outer peripheral portion 28A attempts to return to its original shape, so that the outer peripheral portion 28A pushes the other end face 24B of the support yoke 24 from the second threaded portion 32 side. Thus, the support yoke 24 is urged toward the rack shaft 8. Therefore, the rack shaft 8 is reliably pushed toward the pinion 7A by the urging member 28. Accordingly, it is possible to eliminate backlash between the meshed portions of the pinion 7A and the rack 8A, thereby suppress generation of abnormal noise at the meshed portions.

Note that, in the rack shaft supporting device 15, a friction reducing member 39 may be provided between the urging member 28 and the one end face 32A of the second threaded portion 32. Like the above-described sliding plate 29, the friction reducing member 39 is made of a material (for example, metal) having a low coefficient of friction, or is formed of a plate-like member coated with a film made of a material (e.g., fluororesin) having a low coefficient of friction. Alternatively, the friction reducing member 39 may be a lubricant such as grease. The friction reducing member 39 reduces friction between the one end face 32A of the second threaded portion 32 and the urging member 28.

When the torsion urging member 27 is assembled, as the rack shaft supporting device 15, to the inner peripheral wall 22, the torsion urging member 27 is twisted about the central axis of the main portion 27A in advance. More specifically, the second threaded portion 32 is rotated clockwise in advance as viewed from the left side in FIG. 2, so that the second threaded portion 32 is located at a position offset toward the plug 25 (the right side in FIG. 2) in its initial state. Thus, a preload is applied to the torsion urging member 27, suspended between the second threaded portion 32 and the plug 25, in its circumferential direction, and the torsion urging member 27 is twisted by an amount corresponding to the amount of rotation of the second threaded portion 32.

Figure 3:
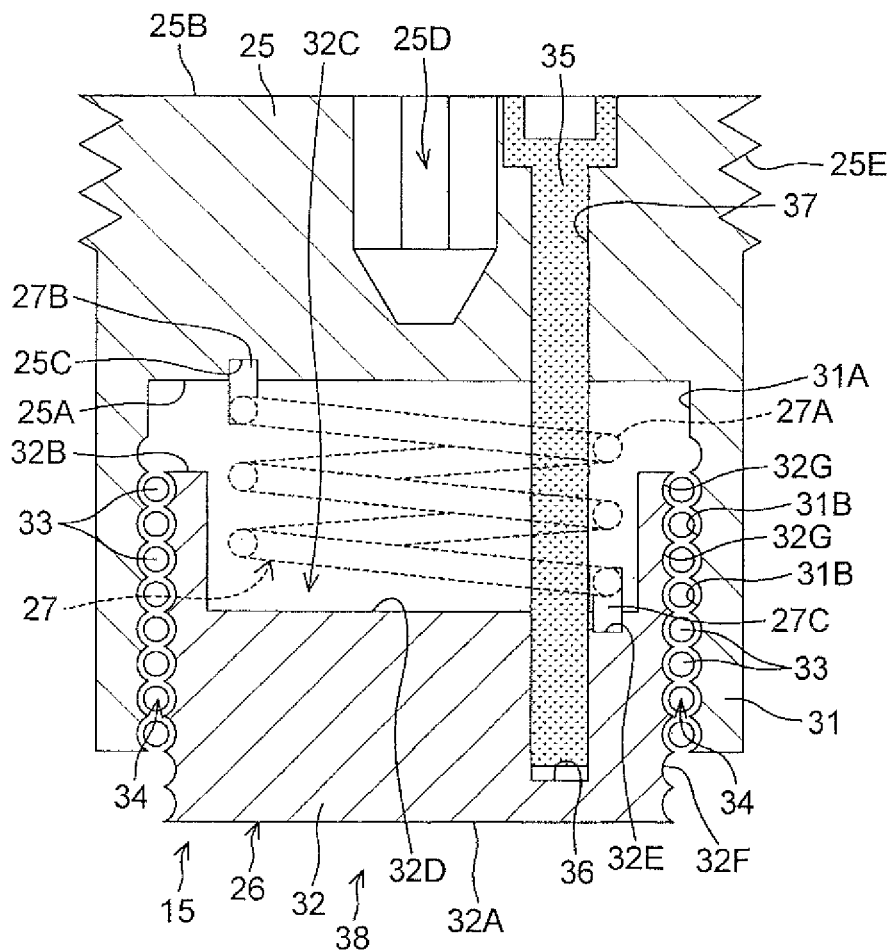
FIG. 3 is a sectional view of main portions of the rack shaft supporting device.

When the second threaded portion 32 is released (for example, when a worker takes his/her hand off the second threaded portion 32) in a state where the torsion urging member 27 has been twisted, the torsion urging member 27 exhibits an urging force by attempting to return to a state before the torsion urging member 27 is twisted, so that the torsion urging member 27 attempts to rotate the second threaded portion 32 in the reverse direction. In order to prevent the torsion urging member 27 from spontaneously returning to the state before the torsion urging member 27 is twisted, a common temporal locking pin 35 (a portion indicated by a dotted pattern) is inserted into both the plug 25 and the second threaded portion 32 with the torsion urging member 27 being twisted, as illustrated in FIG. 3.

More specifically, a positioning hole 36 extending in the axial direction of the second threaded portion 32 is formed in the bottom face 32D of the recessed portion 32C of the second threaded portion 32, at a position that is radially offset from the center of the circular bottom face 32D and that is offset from the engagement hole 32E. Further, a through-hole 37 axially extending through the plug 25 is foamed in the plug 25, at a position that is radially offset from the central axis of the plug 25 and that is offset from the engagement hole 25C. When the torsion urging member 27 is twisted by placing the second threaded portion 32 in the initial state, the positioning hole 36 and the through-hole 37 are located on the same line that extends along the axial direction of the second threaded portion 32 and the plug 25. At this time, when the temporal locking pin 35 is inserted into the through-hole 37 and the positioning hole 36 in this order from the other end face 25B side of the plug 25, the second threaded portion 32 and the plug 25 are temporarily fitted to each other so as to be immovable relative to each other in a state where the torsion urging member 27 is not able to exhibit an urging force although the torsion urging member 27 has been twisted. Thus, the plug 25, the ball screw mechanism 26, and the torsion urging member 27 constitute a single unit 38.

Then, as illustrated in FIG. 2, the unit 38 is inserted, from the other opening 23 side, into the accommodation chamber 20 in which the support yoke 24 and the urging member 28 have been already accommodated, and the threaded portion 25E of the plug 25 is fitted to the threaded portion 22A of the inner peripheral wall 22, as described above. In a state where the assembling is completed, the one end face 32A of the second threaded portion 32 may make contact with the urging member 28 to elastically deform the outer peripheral portion 28A of the urging member 28 to some extent, may make contact with the urging member 28 so as not to elastically deform the outer peripheral portion 28A, or may be slightly apart from the urging member 28.

Subsequently, when the temporal locking pin 35 is pulled out from the through-hole 37 and the positioning hole 36 with the use of a tool or the like (see FIG. 3), the second threaded portion 32 and the plug 25 are allowed to move relative to each other, so that the torsion urging member 27 is able to exhibit an urging force by attempting to return to the state before the torsion urging member 27 is twisted. The torsion urging member 27 exhibiting an urging force is urged all the time so as to rotate the second threaded portion 32 relative to the plug 25 in a direction (in this case, counterclockwise as viewed from the left side in FIG. 2) opposite to the direction in which the torsion urging member 27 is twisted previously and to move the second threaded portion 32 toward the support yoke 24 (the left side in FIG. 2).

With the configuration as described above, in the rack shaft supporting device 15, when abrasion occurs between the rack shaft 8 and the pinion 7A or between the rack shaft 8 and the support yoke 24, the torsion urging member 27 rotates the second threaded portion 32 of the ball screw mechanism 26 and moves the second threaded portion 32 toward the support yoke 24 irreversibly. Thus, the support yoke 24 is pushed against the rack shaft 8 by the second threaded portion 32, so that the abrasion is compensated for (the influence of abrasion is eliminated). Therefore, the urging member 28 is able to apply a constant elastic force to the support yoke 24 in spite of the abrasion. In other words, a clearance between the other end face 24B of the support yoke 24 and the one end face 32A of the second threaded portion 32, which compress the urging member 28, is kept constant so that the elastic force is constant (so that the amount of elastic deformation of the outer peripheral portion 28A of the urging member 28 is constant). As a result, it is possible to eliminate backlash between the meshed portions of the pinion 7A and the rack 8A, thereby suppressing generation of abnormal noise at the meshed portions permanently.

When the abrasion is compensated for with the use of the ball screw mechanism 26, friction between a plurality of components (between the first threaded portion 31 and the second threaded portion 32) that move relative to each other to compensate for the abrasion is minimized by the balls 33. Therefore, when abrasion is caused, the ball screw mechanism 26 is able to reliably compensate for the abrasion in quick response to the abrasion. On the other hand, the ball screw mechanism 26 is configured such that the second threaded portion 32 does not move suddenly. Therefore, for example, when the rack shaft 8 is distorted due to an external force (when a phenomenon unrelated to the abrasion occurs), it is possible to prevent the support yoke 24 from excessively responding to the phenomenon and suddenly moving toward the rack shaft 8. Further, in a configuration such as the ball screw mechanism 26, in which torsion of the torsion urging member 27 is smoothly converted into a linear motion of the second threaded portion 32, it is possible to ensure a relatively large range of abrasions that are able to be compensated for.

Accordingly, in the configuration (the rack shaft supporting device 15) in which the rack shaft 8 is urged toward the pinion 7A, it is possible to improve the reliability of an operational function of compensating for abrasion. As a result, with the rack shaft supporting device 15, it is possible to achieve both the aforementioned compensation for abrasion in response to the abrasion and sliding characteristics of the rack shaft 8 in the support yoke 24, with least external influence. Further, in the steering system 1, in the rack shaft supporting device 15 in which the rack shaft 8 is urged toward the pinion 7A, it is possible to improve the reliability of the operational function of compensating for abrasion.

Further, when the support yoke 24 is moved with the use of the second threaded portion 32 that is moved linearly with high accuracy in the axial direction (of the inner peripheral wall 22, i.e., the direction indicated by the reference character Y) by the ball screw mechanism 26, it is possible to suppress useless movement of the second threaded portion 32 and the support yoke 24 (for example, inclination of the second threaded portion 32 and the support yoke 24 in a direction slanted to the axial direction). Because the useless movement (what is called, backlash) is suppressed, it is possible to reduce a clearance between the inner peripheral wall 22 and each of the support yoke 24 and the second threaded portion 32. Further, because the useless movement is suppressed, the compression state of the urging member 28 is stabilized. Consequently, it is not necessary to ensure a large compression amount of the urging member 28 in consideration of the useless movement, and, accordingly, it is possible to reduce a load (set load) that is applied to the urging member 28 in order to compress the urging member 28.

Further, the aforementioned friction reducing member 39 reduces friction between the second threaded portion 32 and the urging member 28. Accordingly, when abrasion is caused, the ball screw mechanism 26 is able to reliably compensate for the abrasion in response to the abrasion with least influence of friction between the second threaded portion 32 and the urging member 28.

Figure 4:
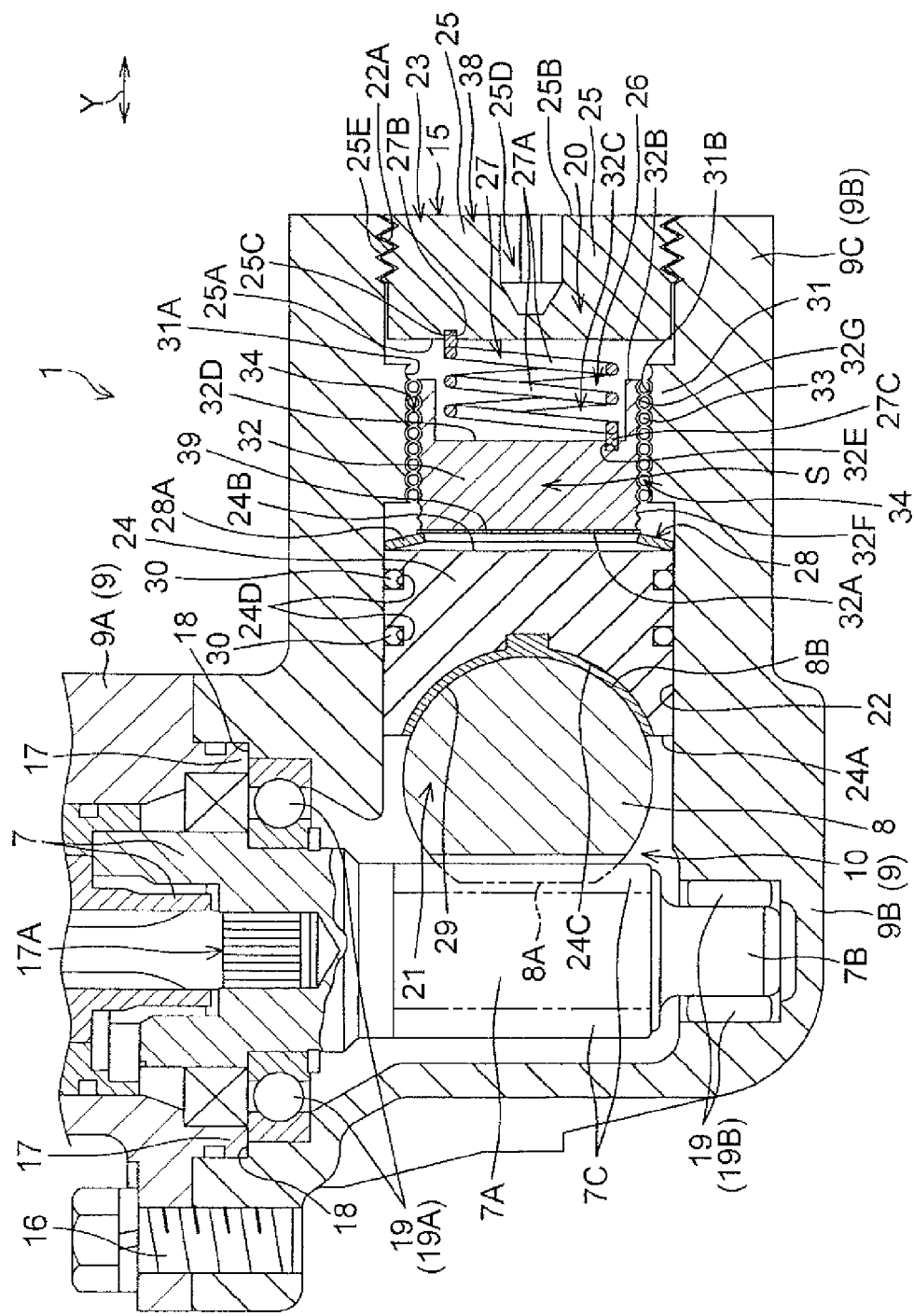
FIG. 4 is a sectional view illustrating a rack shaft supporting device and its surroundings according to a modified example.

The invention is not limited to the embodiment described above, and various modifications may be made within the scope of the appended claims. FIG. 4 is a sectional view illustrating a rack shaft supporting device 15 and its surroundings in the steering system 1 according to a modified example of the embodiment. Note that the same components as those described above will be denoted by the same reference numerals used in the above description, and description thereof will be omitted. Further, the aforementioned first threaded portion 31 is connected to the plug 25 (see FIG. 2). However, as illustrated in FIG. 4, the first threaded portion 31 may be formed integrally with the inner peripheral wall 22 of the accommodation chamber 20 in which the rack shaft supporting device 15 is arranged.

Further, the aforementioned torsion urging member 27 may be a rubber block and a spiral spring having one end side engagement portion 27B and the other end side engagement portion 27C, instead of the coil spring. Furthermore, grease or the like may be provided between the inner peripheral wall 22 and the support yoke 24 so as to ensure sufficient lubrication.

What is claimed is:

1. A rack shaft supporting device arranged in an accommodation chamber formed on a back side of a rack shaft, the back side being an opposite side of the rack shaft from a side on which the rack shaft meshes with a pinion, the accommodation chamber having: (i) one opening opposed to the rack shaft, where an inner peripheral wall is recessed from the one opening in a direction away from the rack shaft, and (ii) an other opening opened at a bottom side of the inner peripheral wall, the rack shaft supporting device being configured to push the rack shaft toward the pinion, the rack shaft supporting device comprising,
a support yoke facing the rack shaft from the one opening, and supporting the rack shaft such that the rack shaft is slidable in an axial direction of the rack shaft;
a plug closing the other opening;
a ball screw mechanism provided between the support yoke and the plug in the accommodation chamber, the ball screw mechanism including:
a first threaded portion fixed to an inner peripheral wall portion and having an inner peripheral face in which a first thread groove is formed, the first threaded portion being formed integrally with the inner peripheral wall portion;
a second threaded portion arranged radially inward of the inner peripheral face of the first threaded portion and having an outer peripheral face in which a second thread groove is formed;
a plurality of balls arranged in a rolling path formed of the first thread groove and the second thread groove that are opposed to each other; and
a torsion urging member arranged between the ball screw mechanism and the plug, the torsion urging member configured to rotate the second threaded portion relative to the plug and to move the second threaded portion toward the support yoke.

2. The rack shaft supporting device according to claim 1, further comprising:
an urging member arranged in a compression state between the support yoke and the second threaded portion, the urging member being configured to urge the support yoke toward the rack shaft.

3. The rack shaft supporting device according to claim 2, further comprising:
a friction reducing member configured to reduce friction between the second threaded portion and the urging member.

4. A steering system supporting the rack shaft so as to be slidable in an axial direction of the rack shaft by the rack shaft supporting device according to claim 1.

* * * * *